(12) United States Patent
Peirce, Jr. et al.

(10) Patent No.: US 6,560,217 B1
(45) Date of Patent: May 6, 2003

(54) VIRTUAL HOME AGENT SERVICE USING SOFTWARE-REPLICATED HOME AGENTS

(75) Inventors: Kenneth L. Peirce, Jr., Barrington, IL (US); Matthew Harper, Arlington Heights, IL (US); Timothy G. Mortsolf, Lisle, IL (US); Yingchun Xu, Buffalo Grove, IL (US); Richard J. Dynarski, Glen Ellyn, IL (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/248,617

(22) Filed: Feb. 25, 1999

(51) Int. Cl.$^7$ .............................................. H04L 12/28

(52) U.S. Cl. ..................... 370/351; 370/601; 709/229

(58) Field of Search ................................. 370/351, 352, 370/356, 401, 402, 466, 468, 522, 524, 410, 229, 230; 709/229, 225, 224, 250

(56) References Cited

U.S. PATENT DOCUMENTS

| | | | |
|---|---|---|---|
| 5,864,669 A | 1/1999 | Osterman et al. ...... 395/200.33 |
| 6,195,705 B1 * | 2/2001 | Leung .................. 370/331 |
| 6,272,129 B1 * | 8/2001 | Dynarski .............. 370/356 |
| 6,301,618 B1 * | 10/2001 | Sitaraman ............. 709/227 |
| 6,366,561 B1 * | 4/2002 | Bender ................. 370/238 |
| 6,377,982 B1 * | 4/2002 | Rai ..................... 709/217 |
| 6,385,653 B1 * | 5/2002 | Sitaraman ............. 638/653 |
| 6,400,722 B1 * | 6/2002 | Chuah .................. 370/401 |

OTHER PUBLICATIONS

C. Perkins, Request for Comments (RFC) 2002, (Oct., 1996).

Charles E. Perkins, Mobile IP Design Principles and Practices, Addiison–Wesley Wireless Communications Series, Chapter 4, pp. 58–93, (1998).

Jue, J.P, et al. "Design and Analysis of A Replicated Server Architecture for Supporting IP Host Mobility", Mobile Computing and Communications Review, vol. 2, No. 3, pp. 16–23, (Jul. 1998).

Malkin, Gary Scott, XP–002084438, "Dual–in Virtual Private Networks Using Layer 3 Tunneling" proceedings of the conference on local computer networks, pp. 555–561, IEEE, (Nov. 2, 1997).

PCT International Search Report for 3Com Corporation, PCT/US 00/03361, dated Aug. 2, 2000.

* cited by examiner

Primary Examiner—Douglas Olms
Assistant Examiner—Ricardo M. Pizarro
(74) Attorney, Agent, or Firm—McDonnell Boehnen Hulbert & Berghoff

(57) ABSTRACT

Multiple home agents for a home agent service provider network are implemented in a single computing platform in software as multiple virtual home agents. Each home agent is assigned or dedicated to a single virtual private network. Any number of home agents can be realized in the computing platform by multiple instantiations of a home agent program or code, and by providing unique IP addresses for each instantiation. Each home agent runs independently, and is independently configured and managed by the subscriber of the virtual private network service, freeing the service provider of having to manage and supervise low level processing tasks and customization features that the subscribers may want. In a representative embodiment, the computing platform comprises a router having a general purpose-computing platform.

5 Claims, 3 Drawing Sheets

VIRTUAL HOME AGENT SERVICE USING SOFTWARE-REPLICATED HOME AGENTS

BACKGROUND OF THE INVENTION

A. Field of the Invention

This invention relates generally to the subject of mobile Internet Protocol ("IP") data networking. The invention also relates to the subject of virtual private networking.

B. Description of Related Art

A virtual private network ("VPN") is a service provided by a telecommunications carrier (such as Sprint or AT&T) in which their public network resources are logically organized by the company but managed by the customer, in a manner to provide capabilities similar to those offered by private networks. The concept can be applied to public packet switched networks, e.g., Internet Protocol or Internet Packet eXchange ("IPX") networks. Essentially, a virtual private network is equivalent to a private data network defined logically within a public network, offering the user the economies of scale of the public network, but the control and management capabilities that are found in a private network.

Where a public IP/IPX network supports virtual private networks, then the elements of the network must be configured to handle data traffic for multiple virtual private networks at the same time. For example, a router in the network would have to handle packets for each virtual private network individually, since each virtual private network is managed separately and will typically have its own unique addressing and routing schemes.

Public packet switched networks can be used to carry traffic to and from a mobile communications device, such as a laptop computer or personal digital assistant equipped with a cellular telephone modem. The basic architecture of mobile IP data networking is known in the art and described in several publications, including the Request for Comments document RFC 2002 (1996) and in the textbook of Charles E. Perkins, *Mobile IP Design Principles and Practices*, Addison-Wesley Wireless Communications Series (1998), the contents of both of which are incorporated by reference herein.

Basically, in Mobile IP communication, a wireless mobile node communicates with a terminal on an IP network by means of a foreign agent and a home agent. Typically, foreign agent functionality is incorporated into a router or network access server chassis located on a mobile node's visited network. The foreign agent provides routing services for the mobile node while it is registered with the foreign agent. The foreign agent de-tunnels and delivers datagrams to the mobile node that were tunneled by the mobile node's home agent. The home agent is a router on a mobile node's home network that tunnels datagrams for delivery to the mobile node via the foreign agent when the mobile node is away from home. The home agent maintains current location information for the mobile node, through a variety of possible mechanisms, such as described in the patent application of Richard J. Dynarski, et al., "Dynamic Allocation of Wireless Mobile Nodes Over an Internet Protocol (IP) Network", Ser. No. 09/233,381, which is incorporated by reference herein. When multiple home agents are handling calls for multiple mobile nodes simultaneously, the home agents are providing, in essence, a service analogous to virtual private network services. Each mobile node is typically associated with a separate home network and the routing path from that home network, through the home agent, to the foreign agent and mobile node is like a virtual private network for the mobile node.

The known prior art for providing Mobile IP networking services has embraced the concept of a single home agent for a given network. However, some larger scale providers of Mobile IP networking services may require multiple home agents on their networks. One possible approach is to provide multiple home agents in separate chassis. Another approach is to provide a single home agent, but design the home agent such that it has an internal architecture to support multiple networks (e.g., multiple virtual private networks). This approach is not considered very attractive, in that management of the home agent would be cumbersome. Furthermore, the home agent would not be particularly fault tolerant, in that any mechanical or software problem in the home agent would potentially affect a large number of virtual private networks.

The present invention provides an efficient, easy to manage method for providing a plurality of home agents on a network. All of the home agents are implemented in a single computing platform. That is, rather than attempting to use a single home agent with an internal architecture to support multiple networks, multiple real home agents, each comprising an instantiation of a home agent software program or code, are implemented in the computing platform. Each home agent is dedicated to performing home agent tasks for a single virtual private network. Each home agent is given its own unique address in the computing platform, thereby providing a mechanism for isolating the processing for each home agent from the other processing. The result is an easily managed, scaleable, and fault tolerant mechanism for providing home agent services, particular in high density and large scale implementations of mobile IP.

These and other features of the present invention will be more apparent from the following detailed description of presently preferred embodiment.

SUMMARY OF THE INVENTION

A method for providing home agent services for a plurality of mobile communications devices is provided. The method may be practiced in the context of virtual private network environment, or otherwise. The method makes use of a computing platform (such as a general purpose computer, router, or network access server) that receives a plurality of packets from a first network. The computing platform is configured as a master home agent device, which implements a plurality of real home agents as distinct processing threads in software. For example, the plurality of home agents may comprise multiple instantiations or replications of a home agent software program or process. The packets that are incoming into the computing platform are directed to the home agent that is associated with the packet. This is preferably accomplished by providing each software-replicated home agent with a unique IP address for purposes of directing the packets to the proper home agent.

The packets are processed in the plurality of home agents in accordance with the requirements of RFC 2002 and mobile IP protocols for home agents, or some lesser set of home agent functionality for mobile IP networking if RFC 2002 is not fully supported. For example, the packets may comprise registration request messages from the mobile communications devices. The home agent would then either process the registration request message itself or use an Accounting, Authorization and Authentication (AAA) server to perform some of the processing, such as authentication processing. As another example, the packets may be data packets to be forwarded from the home agent to the mobile communications device. After processing the packet in the home agent, the packets are forwarded onto a second network for transmission to a destination for the packets.

Preferably, in the above method each of the home agents comprise an instantiation of a home agent software program implemented in the computing platform. Further, each instantiation of the home agent software program is given a unique address in the routing chassis. This keeps the processing for each home agent separate from each other. This also makes the system more fault tolerant and more easily managed by known management protocols (SNMP, etc.).

The computing platform or chassis that the above method is implemented may comprises a router, a general purpose computer or any other suitable network element. The main requirement is that it would have a central processing unit and an operating system capable of implementing multiple software-replicated home agents, maintaining separate addresses for each of them, and having the necessary hardware and software interfaces to other communications elements (such as the networks that are used, and possibly an AAA server), in order to provide the desired home agent service for a plurality of mobile communications devices.

The invention is particularly suitable for use in a virtual private network context. The chassis providing the VPN/home agent services would typically be managed by a wireless service provider. Each home agent would be managed separately either by the service provider, or more preferably by the user of that home agent. The exact manner in which the individual home agents would be managed would typically be worked out as a contractual matter between the provider of the chassis and the company it is providing service to. In any event, the segregation of each home agent into separate address space in the computing platform or chassis will allow each home agent to be independently managed.

In another aspect of the invention, a routing chassis processing packets for a plurality of mobile communications devices is provided. The routing chassis comprises an interface to a first network, two or more software-replicated home agents that are running on a computing platform in the routing chassis, and a means (such as a IP stack implemented in a operating system running on the computing platform, or the equivalent) for demultiplexing a plurality of packets arriving from the first network at the first network interface and for forwarding the packets to the plurality of home agents in accordance with addresses contained in the packets. Preferably, each of the home agents comprises an instantiation of a home agent software program.

In a representative embodiment, the routing chassis comprises two or more interfaces to a second network such as wide area network, wherein each of the interfaces to the second network is associated with one of the home agents. The wide area network may for example provide long haul delivery of packets from the mobile communications device to the device's home network. Furthermore, each of the home agents may be associated with a virtual private network.

In yet another aspect of the invention, a method of handing a registration request from a mobile communications device is provided. The method comprises the steps of implementing a master home agent in a communications chassis such as a router or general-purpose computer. The master home agent comprises a plurality of software-replicated home agents. A registration request message is received from the mobile communications device at the communications chassis and forwarded to one of the plurality of software-replicated home agents. The forwarding is accomplished by reference to an address in the registration request, with each of the software replicated home agents having a unique address.

The software-replicated home agent generates a registration request authentication message and transmits the registration request authentication message to an AAA server. The AAA server either authenticates or does not authenticate the mobile communications device and sends an authentication reply message back to the home agent. The reply is forwarded from the communications chassis to the mobile communications device.

BRIEF DESCRIPTION OF THE DRAWINGS

In the following description, reference will be made to the appended drawings, wherein like reference numbers refer to like elements in the various views, and in which.

DETAILED DESCRIPTION OF THE PREFERRED EMBODIMENT OF THE INVENTION

Figure 1:
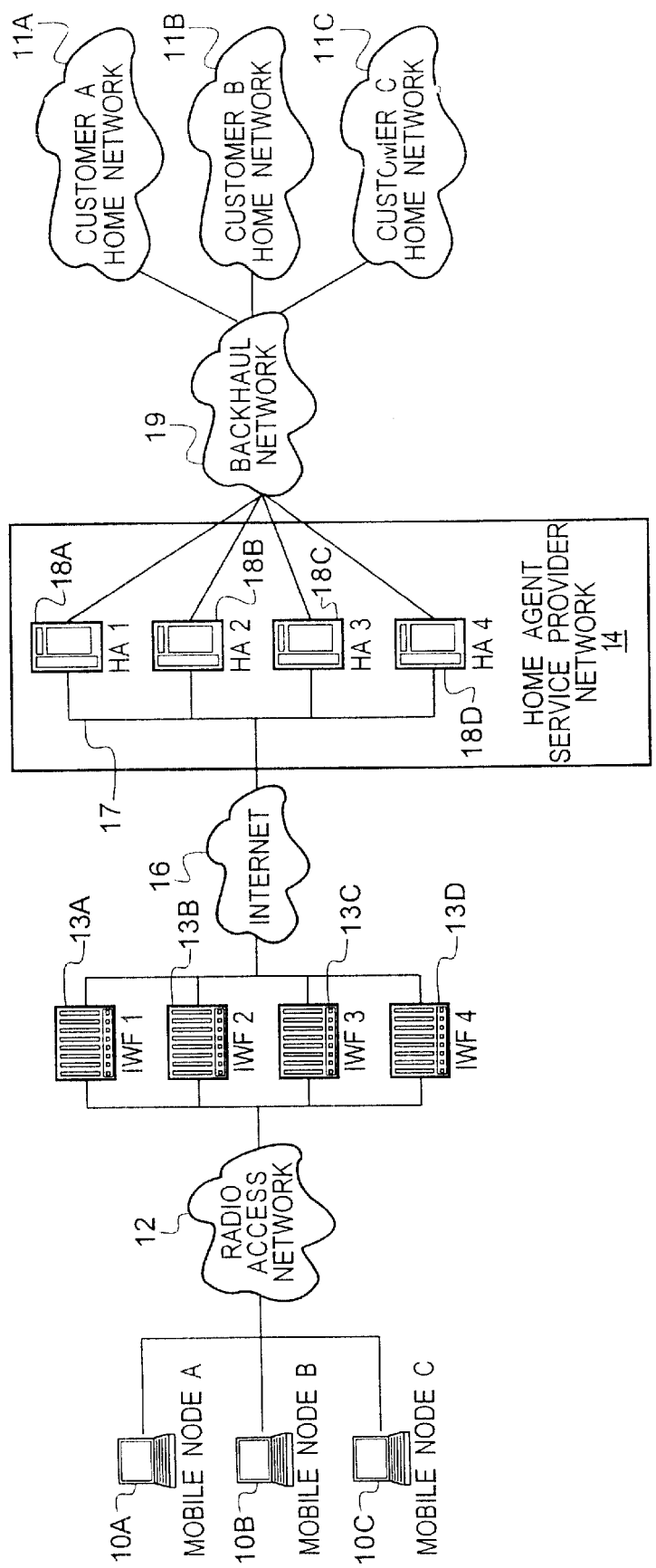
FIG. 1 is an illustration of a virtual private network architecture for a plurality of mobile nodes or communications devices, in which home agent functionality for a plurality of networks is spread out among several home agents, each comprising a separate computing platform.

Overview of Representative Virtual Private Network System for Mobile IP Nodes Referring now to FIG. 1, a basic architecture for providing IP networking services for a group of mobile nodes is shown schematically. In the example of FIG. 1, three wireless users, designated 10A, 10B and 10C, send and receive IP packets with host computers on their home networks 11A, 11B and 11C, respectively. The wireless users or nodes send and receive IP packets by means of a radio access network 12 (the details of which are not important) and one of a plurality of network access servers 13A, 13B, 13C, 13D that function as foreign agents for the wireless devices. The foreign agents 13A . . . 13D are on a network maintained by a provider of mobile IP service, such as a wireless communications company or other suitable entity. The network access servers 13A . . . 13D are of the general type described in the patent of Dale M. Walsh et al., U.S. Pat. No. 5,528,595 and assigned to the assignee of the present invention. Such network access servers are available from companies such as 3Com Corporation, Ascend Communications, and Lucent Technologies. Basically, the network access servers 13A . . . 13D implement foreign agent functions as specified by RFC 2002 and provide access to an IP wide area network such as the Internet 16.

IP packets for the mobile devices are tunneled to the respective foreign agent by a home agent in accordance with the Mobile IP protocol. In the example of FIG. 1, the home agent service provider maintains a network 14 including a local area network 17 in which multiple real home agents 18 are located. In the example of FIG. 1, four such home agents 18A . . . 18D are provided. Each home agent comprises a router with an interface to the local area network and a wide area network interface that connects the home agent to a backhaul network 19 (which may be an Asynchronous Transfer Mode network, frame relay network, or other type of network). The backhaul network 19 is in turn connected via suitable routers to the individual home networks 11A, 11B and 11C of the users 10A, 10B and 10C, respectively.

Figure 2:
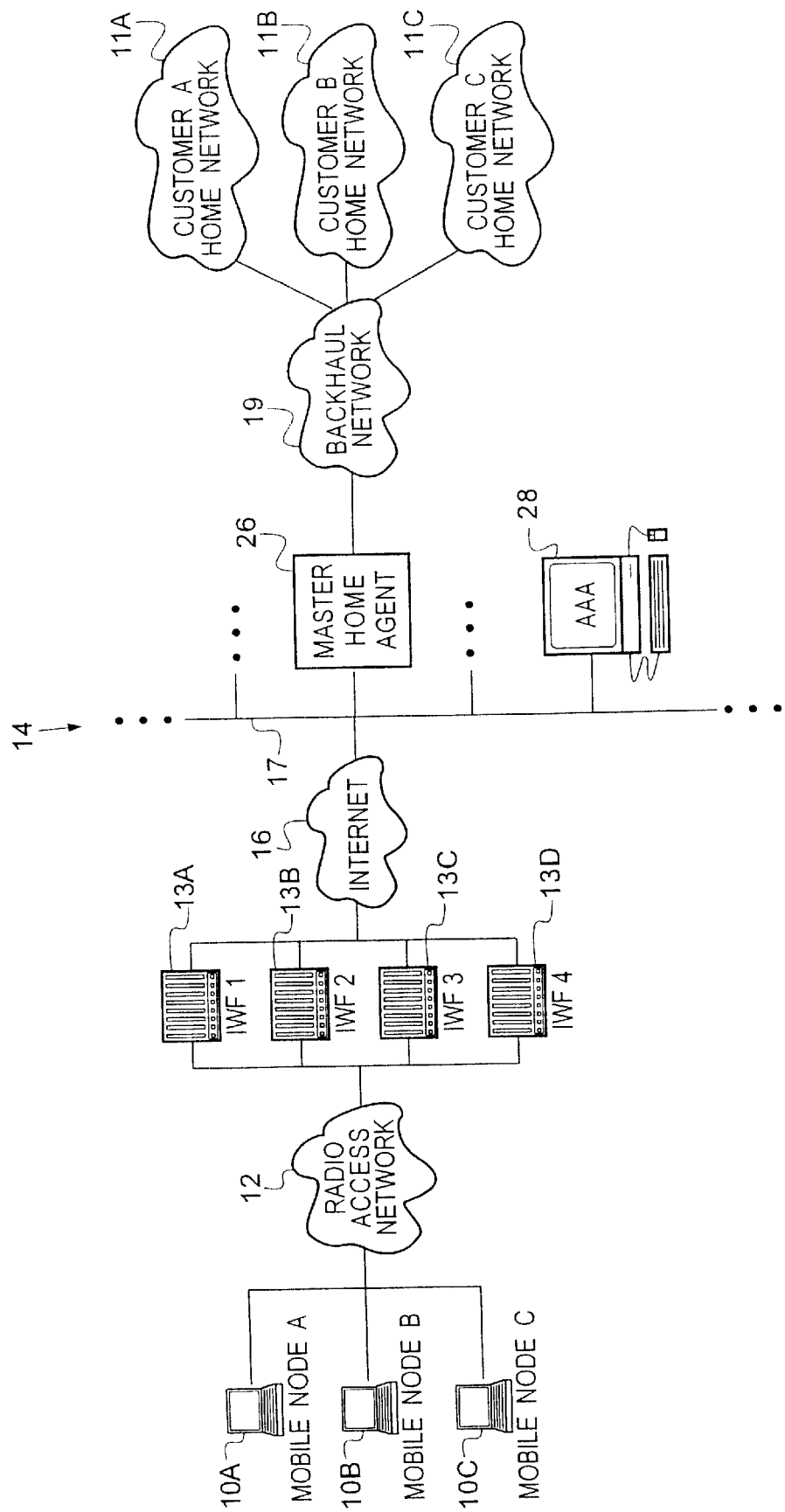
FIG. 2 is an illustration of a virtual private network architecture for a plurality of mobile nodes, in which the functionality of all the home agents of FIG. 1 is combined into a single computing platform, functioning as a router, which is designated a "master home agent." The master home agent implements a plurality of software-replicated home agents.

While the architecture of FIG. 1, and specifically the multiple home agent implementation with multiple discrete chassis is certainly one possible solution for a large scale virtual private network system for multiple mobile IP users, it can be improved upon. With reference to FIG. 2, we propose consolidating the home agents 18A . . . 18D (or more of such home agents) into a single chassis, designated the master home agent 26. The master home agent 26 serves all of the mobile users 10A, 10B, 10C, etc. and all the virtual private networks that are set up between the mobile users and their home networks 11A, 11B and 11C. Rather than attempt to structure the master home agent 26 with an internal software architecture to support multiple networks within a single home agent process, the present invention provides for implementing, in the master home agent 26, multiple real, software-replicated home agents, each comprising an instantiation of a home agent software process or program. This will be described in further detail in conjunction with FIG. 3.

The advantages of multiple real software-based home agents within a single chassis are many. The ease of management, scalability, fault-tolerance, and ease of implementation are perhaps the most striking. Thus, the solution of FIG. 2 is considered a substantial improvement over the alternative organization scheme of FIG. 1.

Furthermore, in another aspect of the invention, the master home agent 26 takes advantage of an AAA server 28 on the local area network 17 for purposes of registration request authentication processing. This off-loads some of the processing and memory requirements from the master home agent and further facilitates management, accounting and authentication issues for the provider of the virtual private network and mobile IP services. This feature will be explained further below.

Software Architecture of Virtual Home Agent Platform

Figure 3:
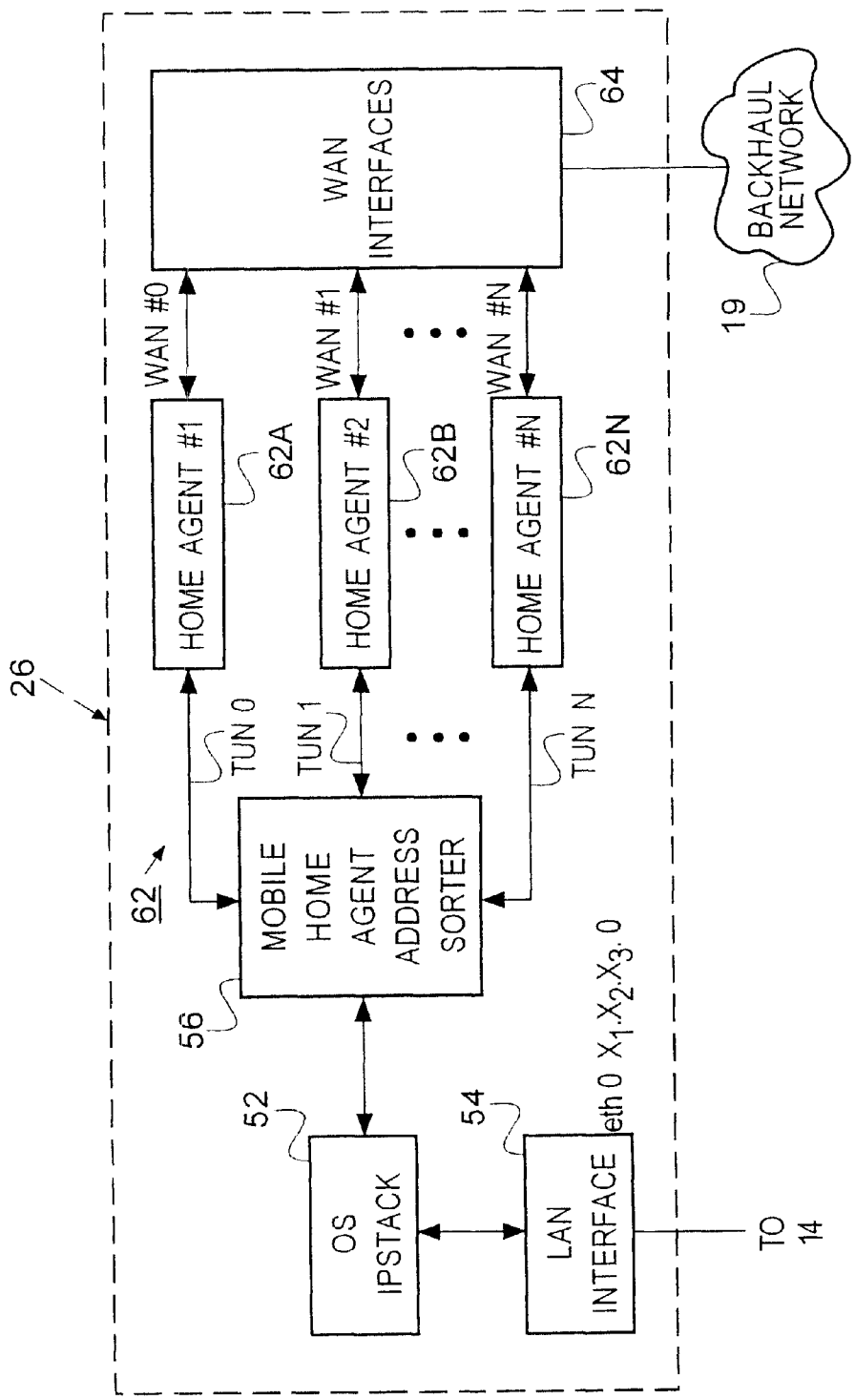
FIG. 3 is an illustration of the software architecture for the computing platform comprising the master home agent of FIG. 2, in which up to n software replicated home agents are implemented, each assigned or dedicated to one virtual private network.

The master home agent 26 of FIG. 2 consists of a computing platform such as a general purpose computer or router, which is set up with a software architecture and hardware interfaces to function as an home agent for the Mobile IP protocol. As such, it consists of a central processing unit, memory, local and wide area network interface cards and drivers and other hardware (not shown) that will be apparent to a person skilled in the art in view of the present discussion and known router platforms. The details of the hardware are not particularly important. For the purposes of the present invention, the software architecture is the pertinent consideration, and such software architecture is illustrated in FIG. 3.

The basic concept of the multiple, real, software-replicated home agent is that the master home agent 26 is a computing platform that implements, via software, multiple home agent process or threads 62A, 62B, . . . 62N. Each home agent 62 is an instantiation of a home agent program or code. Each home agent process is responsible for processing only a subset of the hardware interfaces within the complete system, one software replicated home agent designated to one virtual private network, one LAN interface and one wide area network interface.

Each software replicated home agent 62A, 62B . . . 62N is assigned a unique IP address which is used by the operating system (OS) IP stack 52 to demultiplex packets received on the LAN interface(s) 54. Each home agent process is also connected to a set of Point-Point WAN interfaces 64, which could be realized by Frame Relay, Asynchronous Transfer Mode (ATM) or any other Point-Point WAN Interface.

This structure allows the master home agent 26 to instantiate any number of multiple different home agents, each one isolated for the other by the operating system in the master home agent. This allows each home agent 62 to be configured differently, and provide different types of home agent services and configurations on a per-VPN basis. Each of the individual home agent instantiations 62A, 62B, . . . 62N are not aware of the different multiple virtual private networks within the master home agent platform; rather, they are simply handling registration requests, authentication and other functions according to their internal configuration.

Additionally, the software architecture of FIG. 3 is much more fault tolerant than prior art approaches. This stems from the feature of separating the individual home agents into different address spaces, and thus different processes. If any one home agent misbehaves, the problem can be fixed or isolated, without affecting any of the other home agents or virtual private networks that are currently active.

The master home agent computing platform of FIGS. 2 and 3 has a LAN interface 54 with an address on the IP/IPX network 14 of the form $X_1.X_2.X_3.0$, where $X_i$ is some 3 digit number. The LAN interface 54 receives packets from the IP/IPX network 14 that are designated or belong to any arbitrary number of virtual private networks and home agents. The particular virtual private network to which the packet belongs is determined by an IP address contained in the packet, as discussed below.

The LAN interface 54 forwards packets from the virtual home agent service provider network 14 to an operating system OS IP stack 52 for the master home agent. The operating system in the chassis or master home agent 26 will typically support various communications features, such as an IP protocol stack or software module, of which persons skilled in the art are familiar. The incoming packet from the IP/IPX network 14 will have an IP address associated with one of N possible tunnels, such as $X_1.X_2.X_3.1$ (tun0 in FIG. 3). The OP IP stack 52 uses this IP address to demultiplex the packet and select the proper home agent process 62 to process the packet.

For a packet with an address of $X_1.X_2.X_3.1$, the packet is routed to home agent process 62A by a sorting module 56. The sorting module 56 sorts the packets according to the home agent address in the packet and forwards the packet to the specified home agent process 62A, 62B, . . . 62N (each of which is associated with a unique address). The home agent process 62A acts as a home agent for virtual private network no. 1 in the present example. The home agent process 62A serves mobile node A (10A) in FIG. 2 and mobile node A's home network This sorting process further demultiplexes the packet using the information in the IP tunnel header to decide where to route the packet internal to the home agent process 62A itself. This step allows the home agent process 62A to terminate certain types of data packets, such as Network Management packets (using known management protocols such as SNMP, CMIP, etc.), within the individual processes. This step removes the tunneled packet header leaving the original packet to be forwarded/processed.

When the packet is sent to the home agent process 62A, the home agent functionality as specified in RFC 2002 is performed. The packet is forwarded to a wide area network interface WAN #0 in the WAN interface module 64. WAN #0 interface is an interface that is assigned or dedicated to the VPN #1 home agent 62A. The packet is then sent out via the WAN#0 interface for transmission on backhaul network 19 to a terminal on the customer's network 11A.

For traffic going in the opposite direction, an un-tunneled IP packet arrives on WAN #0 interface, and is forwarded the home agent process 62A. The home agent process 62A uses a routing table to determine which foreign agent (e.g., 13A or 13B of FIG. 2) to forward the packet to. The routing table is built from routing packets its receives on either its WAN interface or its tunX interface. It uses this information to build a tunneled IP packet to send via the OS IP stack 52. The OS IP stack 52 uses the information in the IP header to route the packet to the designated foreign agent, e.g., 13A of FIG. 2.

While the process has been described for one home agent 62A for one virtual private network, it will be appreciated that the process is going on in parallel for multiple virtual private networks in the other home agents 62B, . . . 62N in the master home agent 26. In particular, multiple software-replicated home agents 62A–62N may be instantiated by the operating system at the same time, each one dedicated to its own virtual private network.

Furthermore, since each home agent 62A, 62B . . . 62N is associated with a unique IP address, when the packets are forwarded to the various home agents processes, the information in the IP tunnel header will allow each home agent to terminate management packets, independently of each other, and thus allow each home agent to be separately managed by the VPN subscriber. The management of the separate routing and home agent processes is completely segregated in the master home agent chassis 26 along VPN and home agent customer boundaries. A user of the VPN and its associated home agent can only access and see its own home agent configuration. Additionally, the structure and organization of the master home agent and the network topology of the home agent service provider is completely hidden. This allows the users of the home agent service to be given access to their own home agent process without the need to implement special software to prevent them from accessing or changing another instantiation of a home agent. The entity providing home agent services does not have to be involved in configuration and management of each home agent, as it is left up to the customer. As such, the present invention presents to Mobile IP providers an attractive, flexible and easily managed means for providing home agents for its Mobile IP customers.

From the foregoing, it will be appreciated that we have described a method of providing home agent services for virtual private networks, comprising the steps of:

providing a computing platform (e.g., master home agent 26 or a router in the home agent service provider network) for receiving a plurality of packets from a first network (e.g., IP Network 14), with the plurality of packets associated with a plurality of different virtual private networks or mobile communications devices;

implementing a plurality of home agents 62A . . . 62N in the computing platform;

directing the packets within the computing platform 26 to the home agents 62A, 62B etc. associated with the packets;

processing the packets in the plurality of home agents; and forwarding the packets from the computing platform 26 onto a second network (e.g., WAN 28) for transmission to the destinations for the packets.

Preferably, each of the home agents comprise a separate instantiation of a home agent software program or code implemented in the computing platform. Further, preferably each home agent is assigned or associated with a unique IP address.

While the multiple software home agents are implemented in a router comprising a master home agent in the illustrated embodiment, it is possible to implement the invention in another type of computing platform.

It will also be appreciated that we have described a processing platform for a plurality of packets associated with a plurality of virtual private networks. The processing or computing platform could be implemented in a general-purpose computer configured with hardware interfaces and suitable software to function as a virtual home agent router, or other suitable device. The processing platform comprises a suitable central processing unit and an operating system program implemented by the central processing unit (e.g., Windows NT). The operating system has as a feature an Internet Protocol (IP) stack. A plurality of home agents comprising multiple instantiations of a home agent program 62A, 62B, . . . (FIG. 3) are implemented in the computing platform. Each home agent is associated with one of the virtual private networks, and each home agent has or is associated with a unique IP address. A plurality of network interfaces 64 (FIG. 3) are provided in the computing platform that receive the packets from the home agents. The IP stack 52 directs the packets to the home agents 62A, 62B, etc. assigned to the packets for processing, and the home agents forward the packets to the network interfaces 64 for transmission to a destination (e.g., a RADIUS server, foreign agent, host computer, etc.).

In a preferred embodiment, each of the home agents are separately configured by a user subscribing to its associated virtual private network service, by means such as SNMP or other management packets that are terminated in the home agent processes 62A, 62B, etc.

Further, it will be appreciated that any arbitrary number of software instantiated home agents can be implemented in the computing platform. For example, more than 20 distinct instantiations of the home agent program could be running at one time, each one serving a different virtual private network.

Referring now to FIG. 2, the use of the AAA server 28 in performing registration request authentication functions for a plurality of mobile nodes will be described. For a mobile node to communicate with its peer in the mobile IP protocol, it must be registered with the foreign agent. During the registration process, the foreign agent (e.g., one of the network access servers 13 of FIG. 2) sends a registration request message to the home agent for the mobile device. To determine whether the mobile node should be registered or not, the home agent needs to perform an authentication function for the mobile node. This is to insure that only current subscribers are allowed IP network access, and to deny such access where the mobile node has not paid their bill, is no longer a current subscriber, or is otherwise unauthorized to access the service. While the registration request authentication function could be performed entirely within the computing platform in the master home agent chassis, we prefer to have the authentication function carried out in the AAA server 28. More specifically, information from the registration request (such as the mobile node's IMSI or ESN number, that is, serial number type of information uniquely identifying the device) is forwarded to the AAA server. The AAA server determines from this number whether the mobile node that is seeking registration is authorized or not. The AAA in turn sends a reply indicating the status of the registration request authentication back to the home agent 62 (that is, back to the particular instantiation of the home agent program that sent the authentication request to the AAA server). The home agent then sends back a reply to the registration request message back to the foreign agent, which in turn forwards it to the mobile node. If the registration request is denied, an error code may be included in the reply. Further details on this process are described in the patent application of Richard J. Dynarski, et al., "RADIUS-based Mobile Internet Protocol (IP) address-to-Mobile Identification Number Mapping for Wireless Communication", Ser. No. 09/233401 filed Jan. 19, 1999, the contents of which are fully incorporated by reference herein.

Persons skilled in the art will appreciate that various modifications and alterations from the presently preferred embodiment can be made without departure from the true scope and spirit of the invention. This true scope and spirit is defined by the appended claims, to be interpreted in light of the foregoing.

We claim:

1. A method of handing a registration request from a mobile communications device, comprising the steps of:

providing a master home agent in a communications chassis, said master home agent comprising a plurality of software-replicated home agents;

receiving a registration request from said mobile communications device at said communications chassis and forwarding said registration request to one of a plurality of software-replicated home agents in said communications chassis in accordance with an address in said registration request;

generating a registration request authentication message in said one of said plurality of software replicated home agents;

transmitting said registration request authentication message from said communications chassis to an accounting, authentication, and authorization (AAA) server;

receiving a reply to said registration authentication message from said AAA server at said one of said plurality of software-replicated home agents; and forwarding a reply to said registration request message from said communications chassis to said mobile communications device.

2. The method of claim 1, wherein each of said home agents comprise an instantiation of a home agent software program implemented in said communications chassis.

3. The method of claim 1, wherein said communications chassis comprises a router.

4. The method of claim 1, wherein said communications chassis comprises a general purpose computer.

5. The communications chassis of claim 1, wherein each of said home agents are associated with a virtual private network.

* * * * *